US008647107B2

(12) United States Patent
Casolari

(10) Patent No.: US 8,647,107 B2
(45) Date of Patent: Feb. 11, 2014

(54) DIE FOR MANUFACTURING CERAMIC PRODUCTS

(75) Inventor: Romano Casolari, Castellarano (IT)

(73) Assignee: Trebax S.R.L., Castellarano (IT)

( * ) Notice: Subject to any disclaimer, the term of this patent is extended or adjusted under 35 U.S.C. 154(b) by 426 days.

(21) Appl. No.: 13/163,345

(22) Filed: Jun. 17, 2011

(65) Prior Publication Data

US 2011/0311674 A1 Dec. 22, 2011

(30) Foreign Application Priority Data

Jun. 18, 2010 (IT) ............................. MO2010A0183

(51) Int. Cl.
*B29C 43/36* (2006.01)

(52) U.S. Cl.
USPC ........ 425/405.2; 425/412; 425/415; 425/419; 425/423

(58) Field of Classification Search
USPC ............... 425/405.2, 406, 412, 415, 419, 423
See application file for complete search history.

(56) References Cited

U.S. PATENT DOCUMENTS 4,263,237 A 4/1981 Weeden et al.
4,518,341 A * 5/1985 Suffa ......................... 425/405.2
8,419,400 B2 * 4/2013 Itoh et al. ........................ 425/78

FOREIGN PATENT DOCUMENTS

EP 0620089 A2 10/1994
EP 0736363 A2 10/1996
EP 1714760 A2 10/2006
WO 2006095254 A2 9/2006

* cited by examiner

*Primary Examiner* — Richard Crispino
*Assistant Examiner* — Thukhanh Nguyen
(74) *Attorney, Agent, or Firm* — Pearne & Gordon LLP

(57) ABSTRACT

A die for manufacturing ceramic products, comprising a first (1) half-die (1) and a second half-die (2) located opposite one another, the first half-die (1) comprising a support (6). Fixed to the support (6) there is a plate (7), which deforms and distributes a pressure exerted by said second half-die (2) on said ceramic product and exhibits a peripheral portion (**7*a*) and a central portion (7*b*). A chamber (8) is afforded between the support (6) and the plate (7) for containing an operating fluid and enabling deformation of the plate (7). The peripheral portion (1*a*) exhibits an elastic deformability which is greater than an elastic deformability of the central portion (7*b***).

8 Claims, 5 Drawing Sheets

7d
7
7b
5a
5
9
7c
10
7a
11
6a
13a
5b
13
12
1
2
A
6
8
14
6b
9a
100

DIE FOR MANUFACTURING CERAMIC PRODUCTS

The invention relates to a die for manufacturing ceramic products. In particular, said die is able to produce a tile by compressing powder material placed inside it. In greater detail, the die of the present invention can be mounted on a press in a ceramic tile manufacturing plant.

Dies for manufacturing ceramic tiles comprising a lower half-die having a plurality of cavities able to accommodate ceramic powders are known. The known dies further comprise an upper half-die, located opposite the lower half-die. The upper half-die comprises a plurality of punches, each of which is disposed so as to engage with a corresponding cavity of the opposing half-die in order to press the ceramic material.

It should be noted that a respective tile is formed in each cavity.

In particular, the lower half-die and the upper half-die are movable relative to one another between an open configuration and a closed configuration. In the open configuration the lower half-die and the upper half-die are spaced apart from one another so that the ceramic powder can be introduced inside the cavities of the lower half-die. In the closed configuration, the lower half-die and the upper half-die are pressed against one another so as to press the material and obtain the tiles. Moreover, each cavity has a bottom wall which has the function of shaping the lower or upper surface of the tile. Analogously, each punch has the function of shaping the lower or upper surface. In detail, each punch comprises a support, which is fixed to a plate by means of a plurality of screws disposed in a peripheral portion of the plate. It should be noted that the aforesaid plate has a surface which defines at least in part the bottom wall of the cavity, and has the function of deforming in order to distribute the pressure exerted by the upper counter-die on the ceramic powder contained in the cavity.

Between the plate and the support there is defined a chamber, into which oil is injected under pressure to counter the deformation of the plate and distribute the pressure exerted by the upper half-die. In particular, an elastic membrane or a generic peripheral seal interposed between the plate and the support delimits the chamber for containing the oil. Said elastic membrane, in the peripheral portion of the plate, has a thickened part that is inserted in a groove fashioned in the support.

One disadvantage of the above-described dies for tiles consists in the fact that the pressure exerted on the powder by the lower and upper half-dies is not homogeneous. For this reason, the density of the tile can be non-uniform and, as a consequence, the finished tile may be deformed due to different shrinkages that manifest themselves after firing. To render the distribution of the ceramic powder uniform and the tile density more homogeneous, there are known dies for ceramic tiles which are analogous to the ones previously illustrated, but additionally have through openings fashioned in the plate. In particular, said through openings are fashioned in the peripheral portion of the plate. Plugs are inserted inside said openings and have a shape that is complementary thereto, so as to come up against the thickened part of the elastic membrane. In this manner, the movement of the plugs serves to compensate the pressure along the edges of the die. In particular, an excessive pressure during the operation of the die pushes the plug inside the opening and compresses the elastic membrane in the thickened part. In contrast, a lower than necessary pressure draws back the plug, which, pushed by the thickened part of the elastic membrane, protrudes from the plate. It should be noted that these movements of the plug allow the variations in the pressure on the ceramic powder to be partially compensated for, by compressing it further in the die if the pressure is insufficient or enabling the expansion thereof in the event of excessive pressure.

This solution, however, mitigates the drawback illustrated above without solving it. In other words, the tiles produced by the die just described still exhibit a difference in compactness between the edges and the central part, which manifests itself in surface defects of the tile. Such defects are visible under particular lighting conditions, and compromise the aesthetics thereof.

In this context, the technical task at the basis of the present invention is to propose a die for manufacturing ceramic products which overcomes the drawbacks of the prior art.

In particular, it is an object of the present invention to provide a die for manufacturing ceramic products which is capable of producing tiles with uniform physico-mechanical characteristics. The technical task specified is substantially achieved by a die for manufacturing ceramic products, comprising the technical characteristics set forth, in particular, in the appended claims.

Further characteristics and advantages of the present invention will become more apparent from the approximate, and hence non-restrictive, description of a preferred, but not exclusive, embodiment of dies for manufacturing ceramic products as illustrated in the appended drawings, in which.

With reference to the appended figures, 100 indicates a die for manufacturing ceramic products according to the present invention. Said die 100 comprises a first half-die 1 and a second half-die 2, capable of cooperating to produce a ceramic tile (not illustrated) by pressing, for example, ceramic powder material. In fact, the same structure can be used to press "semi-pressed" material or in any case material other than powder.

Figure 1:
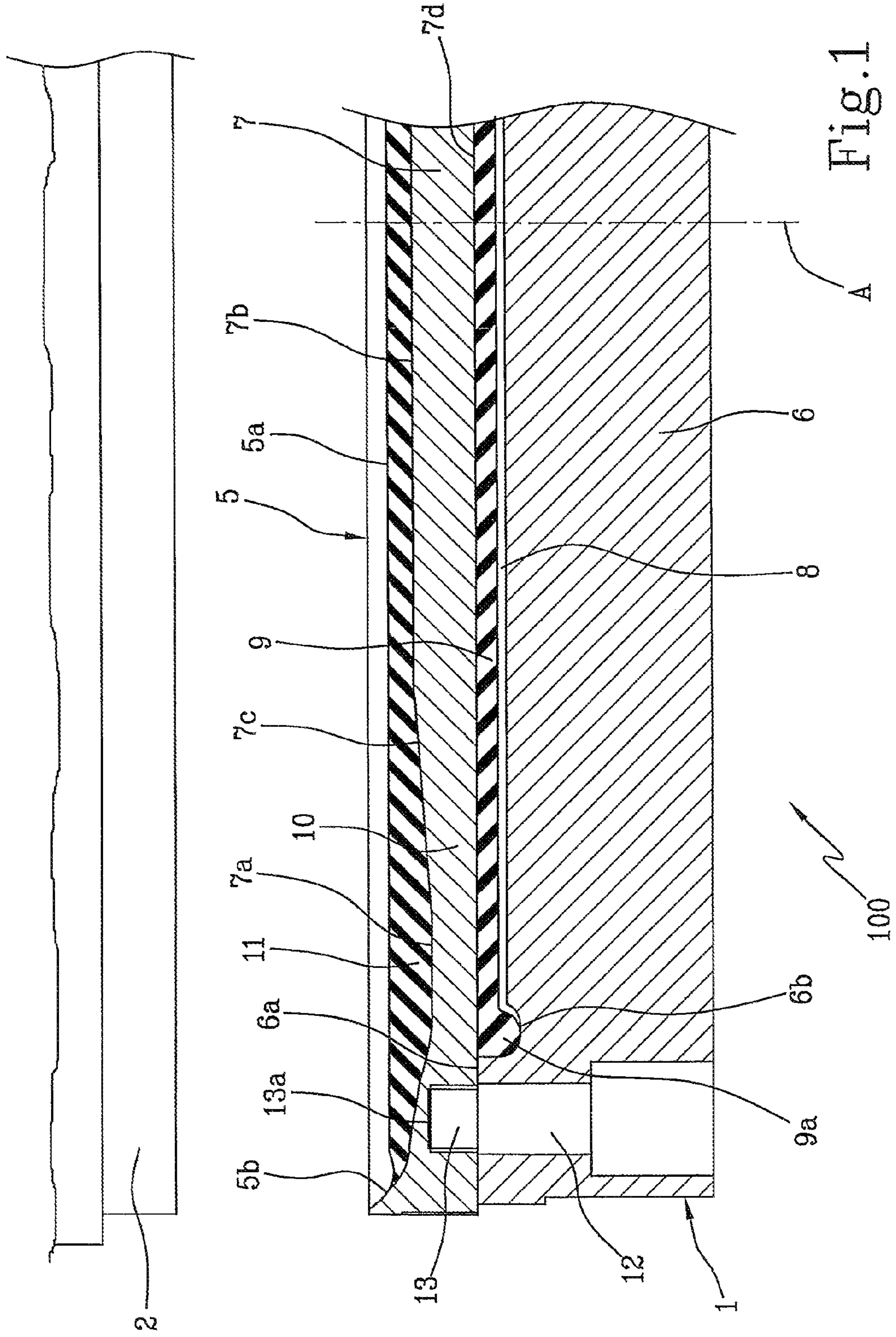
FIG. 1 is an enlarged and interrupted sectional view of a die for manufacturing ceramic products according to the present invention.
Figure 3:
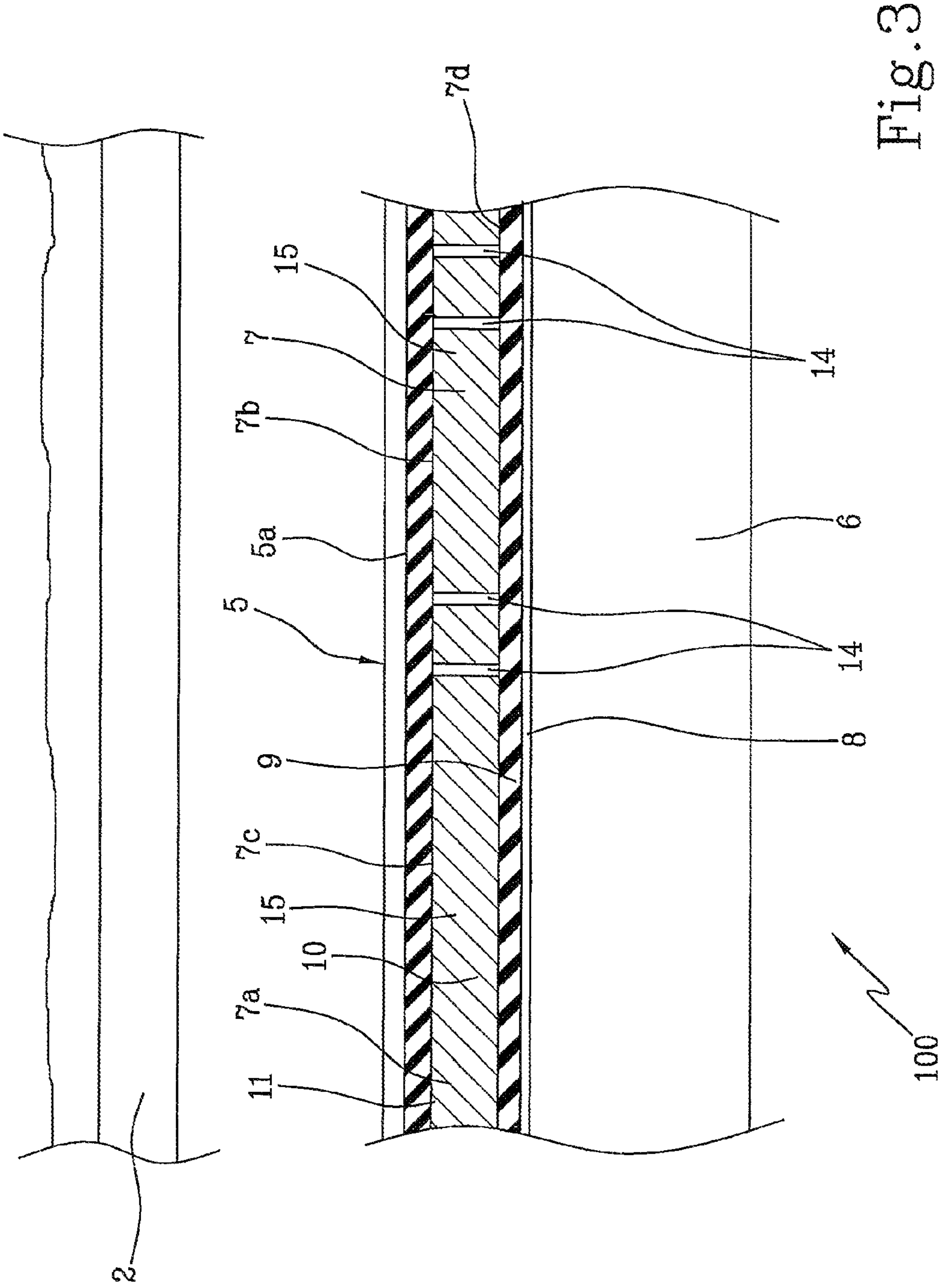
FIG. 3 is part of a sectional view along a plane indicated by the broken line II-II in the subsequent FIG. 4, of another embodiment of a die for manufacturing ceramic products according to the present invention.

As is schematized in FIGS. 1 and 3, the second half-die 2 is facing the first half-die 1, so that the powder or "semi-pressed" material can be introduced between them. In other words the first half-die 1 and the second half-die 2 are located opposite one another. In the embodiments shown in FIGS. 1 and 3, the first half-die 1 is positioned below the second half-die 2. Other relative positions of the first half-die 1 and of the second half-die 2 are however possible.

In the first half-die 1, a cavity 5 is fashioned so as to receive a predetermined amount of material to form the ceramic tile. In particular, said cavity 5 has a bottom wall 5*a* and side walls 5*b*.

It should be noted that the bottom wall 5*a* of the cavity 5 has the function of forming an upper or lower surface of the tile. In both embodiments described a single first half-die 1 located opposite the second half-die 2 is shown, but in further embodiments (not illustrated) the die 100 can comprise a plurality of half-dies. Advantageously, in this manner it is possible to form, with a single pressing operation, a corresponding plurality of tiles.

Figure 2:
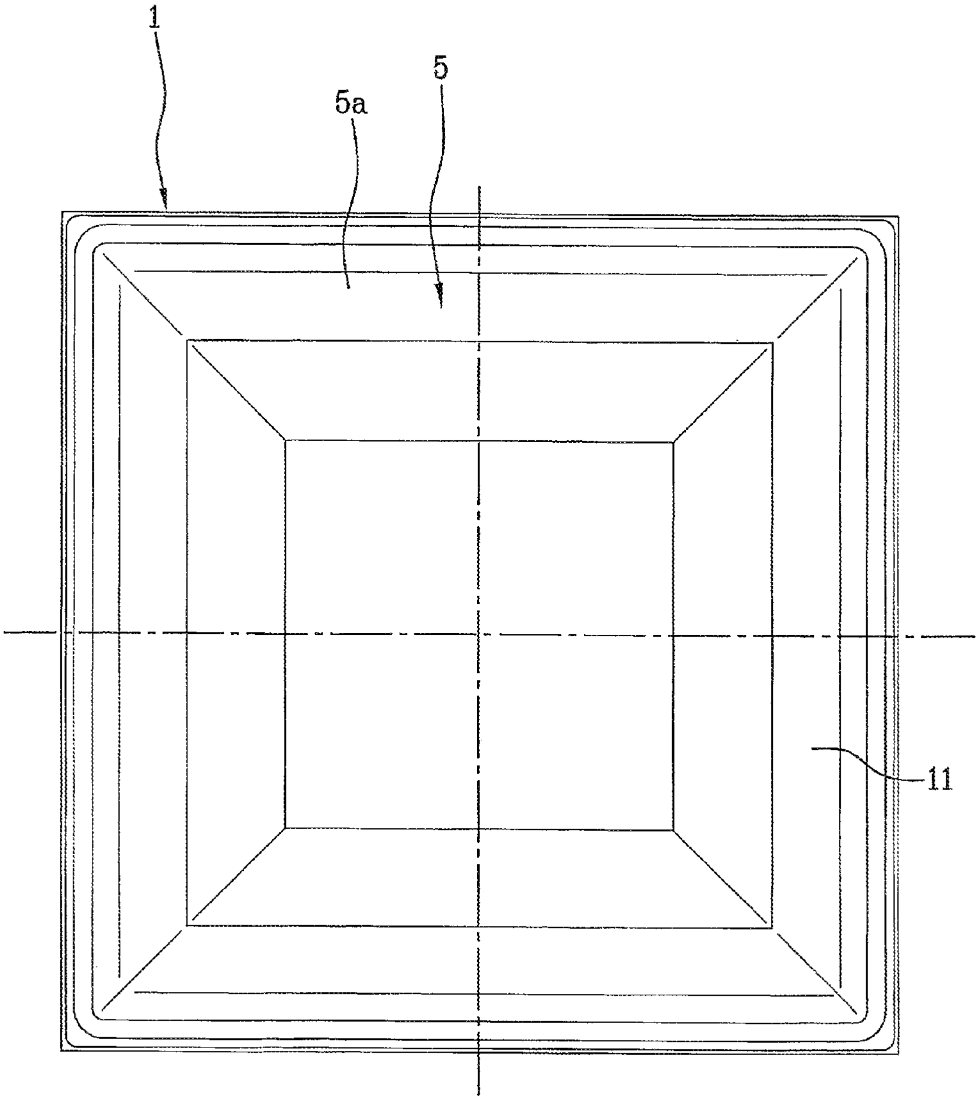
FIG. 2 is a plan view from above of the lower half-die of the die of FIG. 1.

Moreover, as can be seen in FIG. 2, the cavity 5 has a square plan shape, but it is also possible to use cavities having other plan shapes, for example rectangular, hexagonal and still others.

The first half-die 1 comprises a support 6, with which there is associated a plate 7 shaped so as to define the cavity 5. With reference to FIGS. 1 and 3, the plate 7 exhibits a peripheral portion 7*a*, fixed to the support 6, and a central portion 7*b*. It should be noted that the face 7*a* of the plate 7 is in contact with a face 6*a* of the support 6, preferably in the peripheral portion 7*a* thereof. Moreover, a chamber 8 is afforded between the plate 7 and the support 6 to enable deformation of the plate 7. Said chamber 8 is preferably situated in the face 6*a* of the support 6. In greater detail, the chamber 8 is fashioned in a hollow portion of the support 6, so as to define a space for allowing the plate 7 to bend. This enables the plate 7 to deform and distribute a pressure exerted by the second half-die 2 on the tile.

Moreover, the plate 7 is removably fixed to the support 6, so that the plate 7 can be replaced to modify the thickness or conformation of the back surface of the tiles to be formed.

In detail, the plate 7 exhibits a surface 7*c*, opposite the support 6 and inclined in relation to the face 6*a*. The plate 7 further exhibits a side 7*d* which is flat and facing the support 6. The plate 7 is preferably made of metal material.

To enable correct bending of the plate 7 and distribute the pressure inside the die, the above-mentioned chamber 8 is liquid tight, so that it can be filled with a substantially non-compressible operating fluid, e.g. oil. The operating fluid can be delivered into the chamber 8 via a circuit comprising one or more conduits (not illustrated) preferably afforded in the support 6. In particular, the first half-die 1 comprises an elastic membrane 9, interposed between the plate 7 and the support 6. Said membrane 9, preferably made of impermeable elastomeric material, has the function of containing the operating fluid in the chamber 8. Moreover, in the peripheral portion 7*a* of the plate 7, the membrane 9 exhibits a thickened part 9*a*, which is inserted in a groove 6*b* fashioned in the support 6. Advantageously, the thickened part 9*a* has the function of a gasket, such as to prevent the operating fluid from entering into contact with the plate 7.

In the first half-die 1 according to the present invention, the peripheral portion 7*a* of the plate 7 exhibits an elastic deformability which is greater than an elastic deformability of the central portion 7*b*. With reference to the embodiment shown in FIG. 1, the peripheral portion 7*a* of the plate 7 is thinner. In other words, the plate 7 has a non-uniform thickness. In particular, in its peripheral portion 7*a* the plate 7 exhibits a smaller thickness than the thickness measured in the central portion 7*b*.

In the embodiment of FIG. 1, the thickness of the plate 7 varies gradually and progressively from the peripheral portion 7*a* to the central portion 7*b*. The surface 7*c* of the plate 7 is thus convex in the central portion 7*b*. It should be noted, moreover, that the peripheral portion 7*a* and the central portion 7*b* are connected together without any sharp edges.

The first half-die 1 and the second half-die 2 can be made with any combination of the two embodiments.

With reference to the embodiment shown in FIG. 3, the plate 7 exhibits a plurality of incisions 14 in the peripheral portion 7*a*. In particular, each incision 14 defines a respective flexible element 15 integrated in the plate 7.

Moreover, each flexible element 15 exhibits an end 15*a* which is movable along a direction perpendicular to the plate 7 in order to vary the pressure that the die 100 is capable of exerting in the peripheral portion 7*a* of the plate 7. In the embodiment of FIG. 3, each flexible element 15 is made with a shaped incision 14 on the plate 7. In this manner, each flexible element behaves like a flexible beam fitted to the plate 7.

Figure 4:
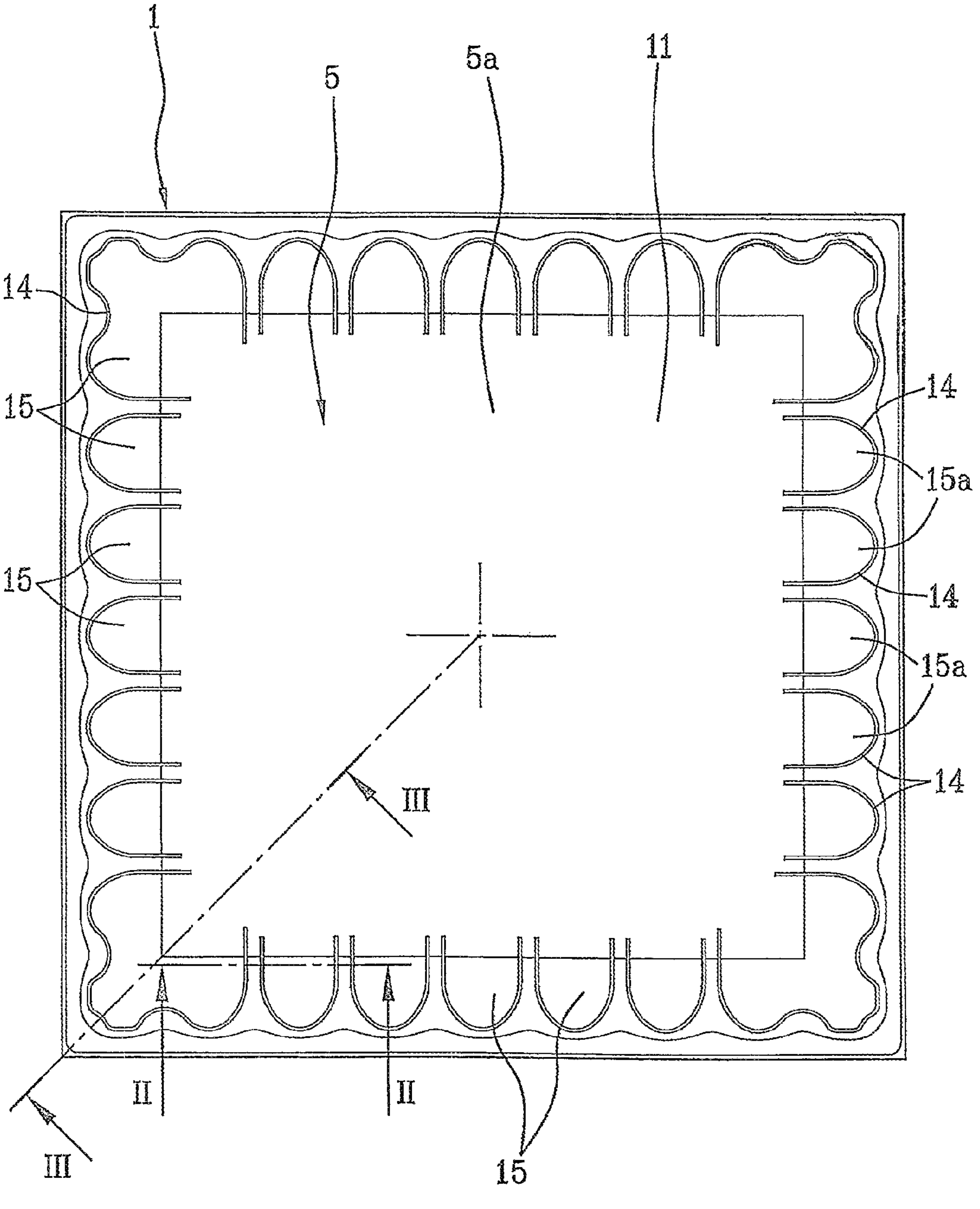
FIG. 4 is a plan view from above of the lower half-die of the die of FIG. 3.
Figure 5:
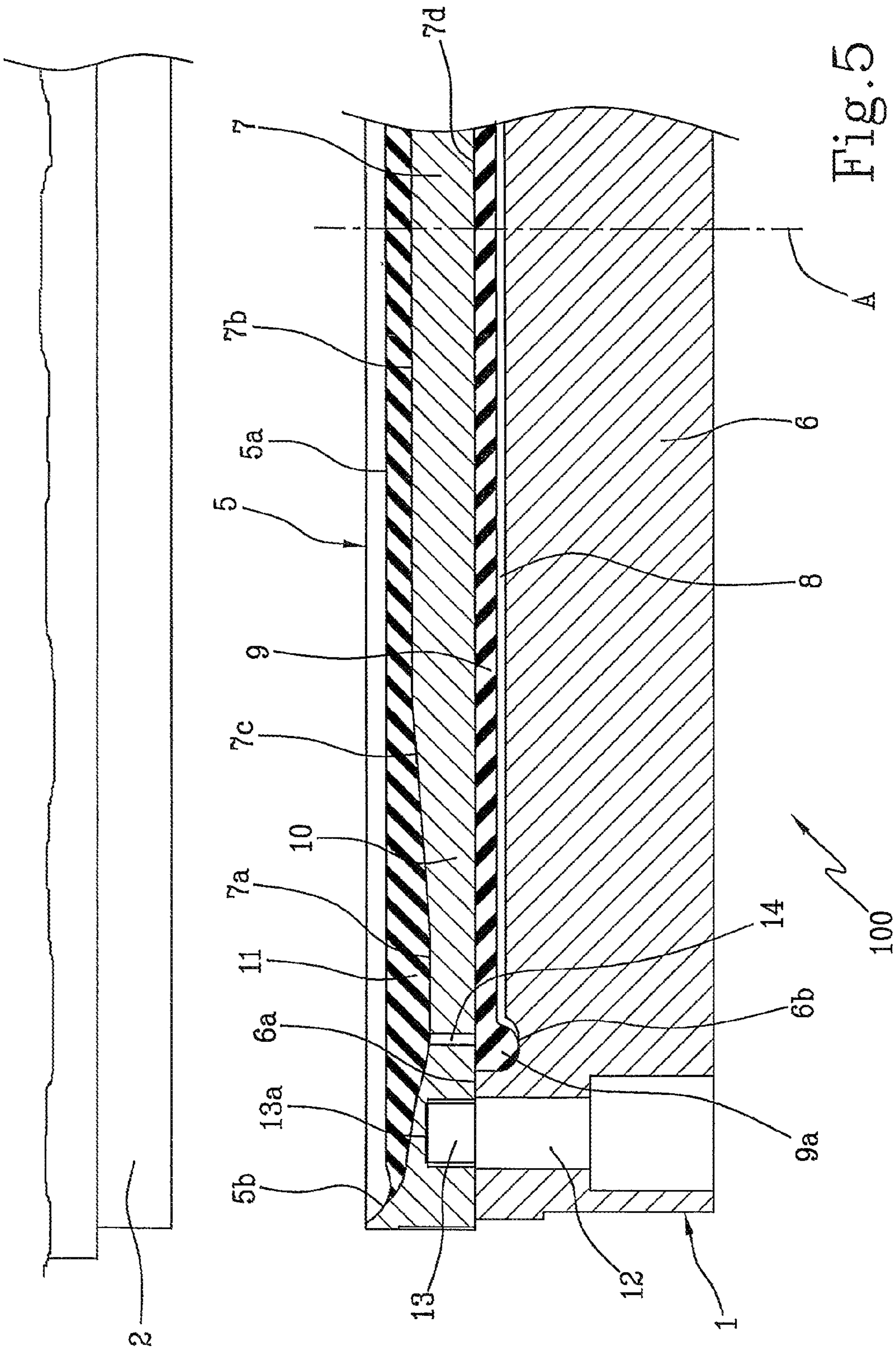
FIG. 5 is part of a sectional view along a plane indicated by the broken line in FIG. 4.

It should be noted, as can be seen in FIG. 4, that the incisions 14 are through incisions. In other words, each incision 14 extends through the entire thickness of the plate 7. In particular, the incisions 14 located away from the corners have a "U" shape. The incisions 14 located at the corners, in contrast, have a multi-lobe shape, i.e. having a plurality of lobes 16. In particular, said incisions 14 located at the corners of the plate 7 have a trilobe shape, i.e. having three lobes 16.

In the embodiment of FIG. 3 the plate 7 can have a constant or variable thickness.

The variable thickness of the plate 7 in the embodiment of FIG. 1 or the flexible elements 15 of the embodiment of FIG. 3 define an area of weakness 10 in the plate 7.

The area of weakness 10 has the function of rendering the plate 7 more easily deformable in the peripheral portion 7*a* than in the central portion 7*b*. Advantageously, this allows the pressure exerted by the operating fluid to be uniformly distributed during operation of the die 100. The first half-die 1 comprises a covering 11 of the plate 7, in contact with the surface 7*c* of the plate 7. Said covering 11 can be made of elastomeric material, preferably rubber or vulcanized resin. Moreover, the covering 11 can comprise a plurality of recesses (not illustrated) to configure protrusions normally provided on the back surface of the tiles. In particular, the covering 11 exhibits a surface opposite the plate 7, which defines the bottom wall 5*a* of the cavity 5.

It should be noted that, in the embodiment shown in FIGS. 1 and 2, the covering 11 exhibits a greater thickness in the peripheral portion 7*a* of the plate 7 compared to the thickness measured in the central portion 7*b* of the plate 7, such as to render the surface 1*a* substantially flat.

The plate 7 and the support 6 are reciprocally fixed by constraining elements (not illustrated) disposed along the peripheral portion 7*a* of the plate 7. It should be noted that the thickness of the plate 7 is minimal in proximity to the constraining elements. In the example represented, each constraining element can be, for example, a screw having a head and a threaded shank. The head of each screw is up against the support 6, whereas the threaded shank passes through a corresponding through hole 12 fashioned in the support 6. A portion of the threaded shank engages with a threaded hole 13 fashioned in the plate 7. The threaded hole 13 is blind. The length of the portion of the threaded shank which engages with the threaded hole 13 is less than the length of the threaded hole 13. In this manner, between one end of the threaded shank opposite the head and a transverse surface 13*a* of the threaded hole 13 an empty space is defined. The empty space assures that the end of the threaded shank is not in contact with the transverse surface 13*a* of the threaded hole 13.

In an alternative embodiment not represented in the appended figures, the second half-die 2 exhibits a structure analogous to that of the first half-die 1. In other words, the second half-die 2 can comprise a support to which a plate capable of deforming is fixed. Like the first half-die 1, the second half-die 2 can further comprise a chamber afforded between the support and the plate. Moreover, the plate of the second half-die 2 can exhibit variations in thickness analogous to those previously described with reference to the plate 7 shown in FIGS. 1 and 2. Alternatively, the plate of the second half-die 2 can exhibit incisions analogous to the incisions 14 shown in FIGS. 3 and 4 and previously described. During operation, the die 100 is initially in an open configuration, in which the first half-die 1 and the second half-die 2 are spaced apart from one another.

Once the die 100 is initially loaded with the material, the first half-die 1 and the second half-die 2 are moved in relation to one another by driving means which are not shown, so as to be brought into the final configuration. In the final configuration, the first half-die 1 and the second half-die 2 interact with one another so as to obtain corresponding ceramic tiles in a raw state.

The operating fluid is delivered, preferably under pressure, inside the chamber 8, so as to counter the deformation of the plate and distribute the pressure exerted by the upper half-die. Thanks to the area of weakness 10 of the plate 7, the operating fluid can deform the plate 7 in order to compress different areas of the powder material contained in the cavity 5 in a differentiated manner. In particular, since the plate 7 exhibits an area of weakness 10 in a peripheral portion 7*a*, the plate 7 deforms locally more than a non-weakened plate would do. By suitably calibrating the entity and configuration of the weakness it is thus possible to render uniform the pressure exerted inside the cavity 5.

The invention achieves the proposed objective. In particular, the deformability of the plate is greater in the peripheral portion, so as to allow the operating fluid to suitably distribute the pressure exerted by the second half-die and thus enable the production of tiles with homogenous characteristics.

The invention claimed is:

1. A die for manufacturing ceramic products, comprising a first half-die (1) and a second half-die (2) located opposite one another, the first half-die (1) comprising a support (6); a plate (7) fixed to the support (6) which deforms and distributes a pressure exerted by said second half-die (2) on said ceramic product, said plate (7) exhibiting a peripheral portion and a central portion (7*b*); a chamber (8) afforded between said support (6) and said plate (7) for containing an operating fluid and enabling deformation of said plate (7), said peripheral portion (7*a*) exhibiting an elastic deformability which is greater than an elastic deformability of the central portion (7*b*);

characterised in that said plate (7) exhibits a smaller thickness in the peripheral portion (7*a*) of said plate (7) than the thickness of the plate (7) in the central portion (7*b*) thereof; said thickness further being variable progressively from the peripheral portion (7*a*) to the central portion (7*b*); said plate (7) exhibiting a surface (7*c*) opposite said support (6), said surface (7*c*) being convex at least in said central portion (7*b*).

2. The die of claim 1, characterised in that said plate (7) exhibits a side (7*d*) which is flat and facing said support (6).

3. The die of claim 2, characterised in that said first half-die (1) comprises an elastic covering (11) of said plate (7) on said surface (7*c*) for forming said ceramic product; said covering (11) exhibiting a greater thickness in the peripheral portion (7*a*) of the plate (7) than in the central portion (7*b*) of the plate (7).

4. The die of claim 1, characterised in that it exhibits a plurality of incisions (14) in said peripheral portion (1*a*), each incision (14) defining a respective flexible element (15) integrated in the plate (7) and exhibiting an end (15*a*) which is movable along a direction perpendicular to the plate (7) in order to vary said pressure in the peripheral portion (7*a*) of said plate (7).

5. The die of claim 4, characterised in that said incisions (14) are through incisions.

6. The die of claim 4, characterised in that each flexible element (15) is made in a single piece with the plate (7).

7. The die of claim 1, characterised in that said peripheral portion (7*a*) and central portion (7*b*) are connected to one another without any sharp edges.

8. The die of claim 1, characterised in that it comprises a plurality of constraining elements in said peripheral portion (7*a*) of the plate (7) in order to fasten said plate (7) to said support (6); the thickness of the plate (7) being minimal in proximity to the constraining elements.

* * * * *